United States Patent [19]

Brock

[11] 4,337,878
[45] Jul. 6, 1982

[54] METHOD OF WEIGHING AND DISPENSING MATERIAL FROM A SURGE BIN

[75] Inventor: James D. Brock, Chattanooga, Tenn.

[73] Assignee: Astec Industries, Inc., Chattanooga, Tenn.

[21] Appl. No.: 191,276

[22] Filed: Sep. 26, 1980

Related U.S. Application Data

[60] Division of Ser. No. 951,373, Oct. 10, 1978, Pat. No. 4,248,359, which is a continuation-in-part of Ser. No. 912,501, Jun. 5, 1978, Pat. No. 4,249,351.

[51] Int. Cl.³ .............................................. B65G 27/24
[52] U.S. Cl. ........................................ 222/1; 222/58; 222/77; 177/1; 177/123
[58] Field of Search ................... 222/1, 52, 55, 56, 58, 222/77; 177/1, 60, 63, 64, 66, 116, 117, 119, 122, 123

[56] References Cited

U.S. PATENT DOCUMENTS

| 3,193,029 | 7/1965 | Harvison et al. | 177/122 X |
| 3,319,828 | 5/1967 | Maxwell | 222/58 X |
| 3,618,684 | 11/1971 | Burke et al. | 222/58 X |
| 4,111,336 | 9/1978 | Ward et al. | 222/58 |

Primary Examiner—Joseph J. Rolla
Attorney, Agent, or Firm—Jones & Askew

[57] ABSTRACT

Apparatus for weighing-out material from a collapsible surge bin. The surge bin is mounted above a collapsible frame such that the points of attachment of the surge bin to the collapsible frame comprise a load cell for weighing the surge bin and the contents thereof. The load cells are connected to control circuitry which actuate a gate in the bottom of the surge bin to thereby dispense asphalt-aggregate material from the surge bin. The control circuitry also operates a door in a batcher above the surge bin to thereby regulate the flow of asphalt-aggregate material being delivered into the surge bin.

2 Claims, 7 Drawing Figures

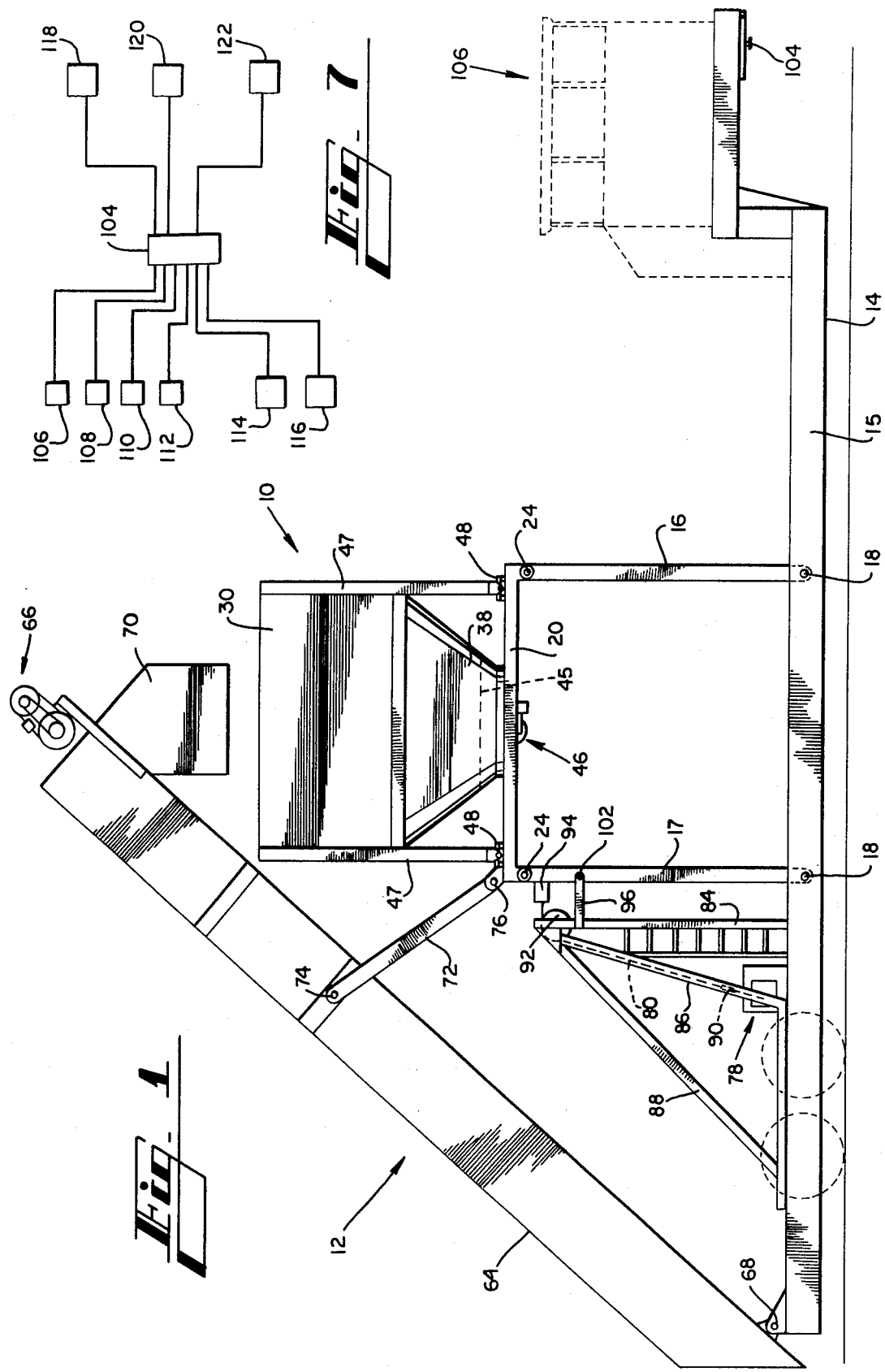

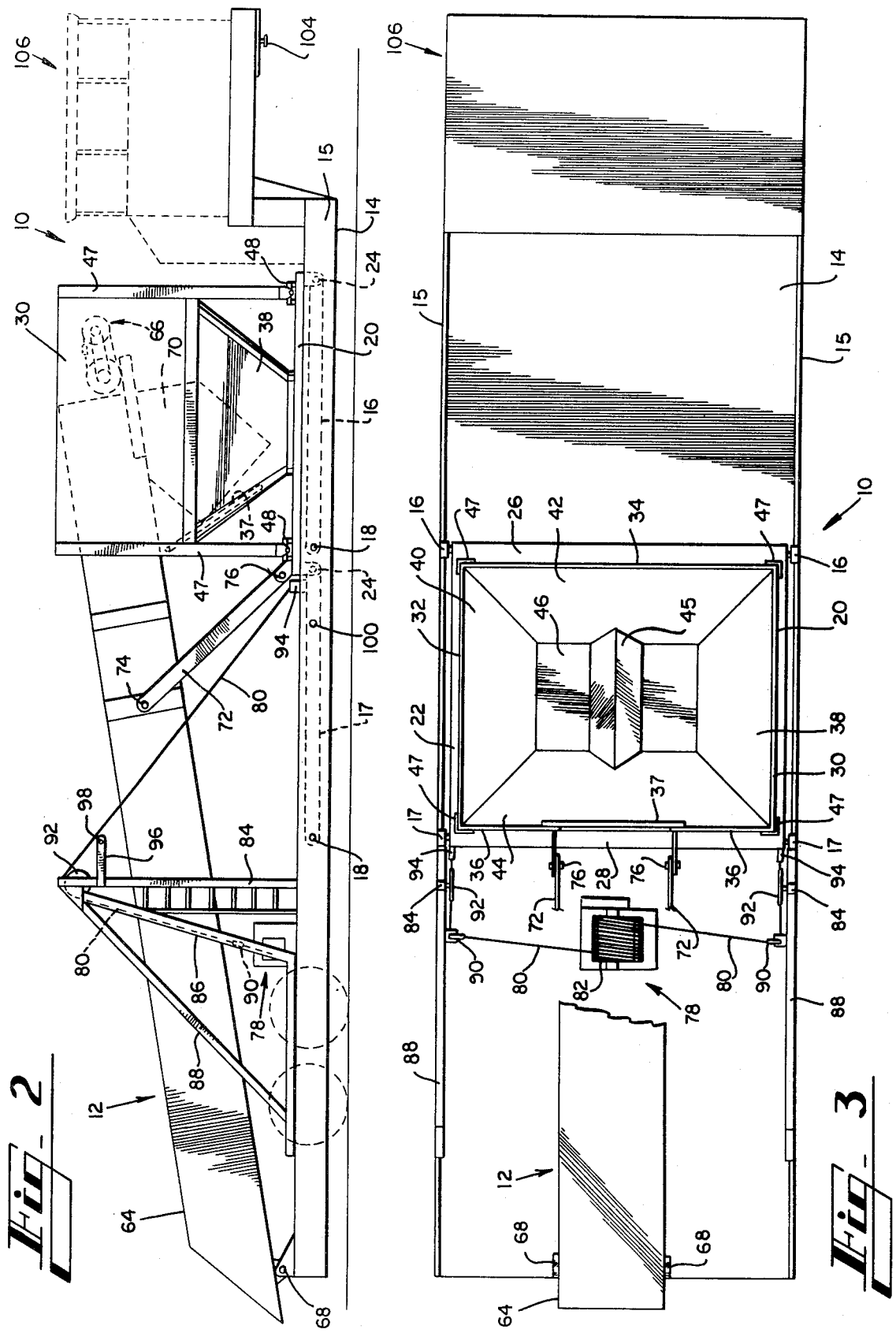

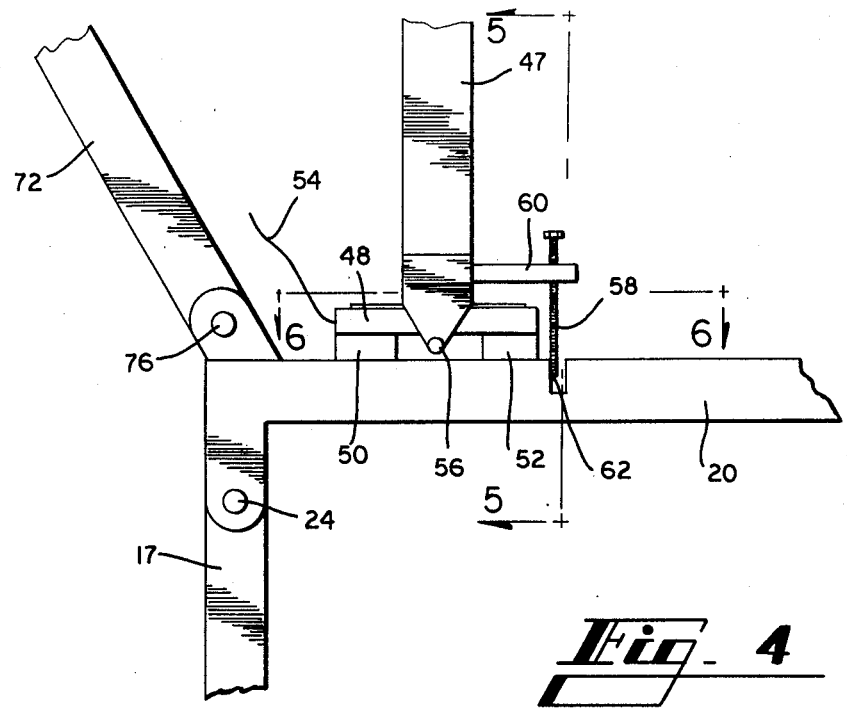
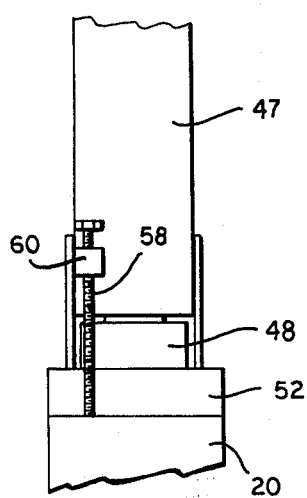 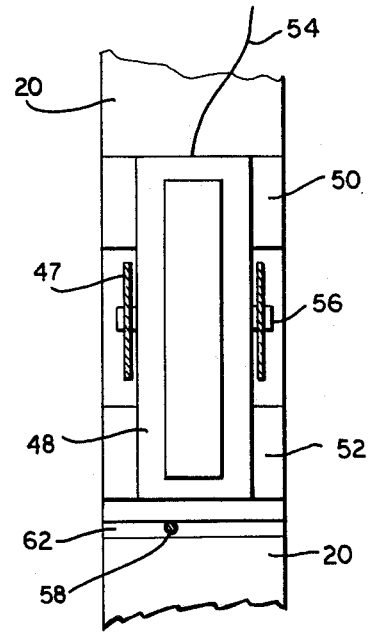

METHOD OF WEIGHING AND DISPENSING MATERIAL FROM A SURGE BIN

CROSS-REFERENCE TO RELATED APPLICATION

This application is a division of application Ser. No. 951,373 filed Oct. 10, 1978, now U.S. Pat. No. 4,248,359, which is a continuation-in-part of application Ser. No. 912,501 filed June 5, 1978, now U.S. Pat. No. 4,249,351.

BACKGROUND OF THE INVENTION

The present invention relates generally to apparatus for weighing-out material in a surge bin, particularly asphalt-aggregate material from a collapsible surge bin.

The term surge bin is used in the asphalt industry to designate a bin used for the temporary storage of asphalt-aggregate material between the time it is produced and the time the material is loaded on a truck for transportation to a work site. The surge bin is usually mounted on legs to elevate the bin to a height which permits a truck to be driven underneath the surge bin. A gate in the bottom of the surge bin is then opened and the asphalt-aggregate material falls out of the bin into the truck below.

It is usually necessary or desirable to know how much asphalt-aggregate material is being loaded onto the truck. A prior apparatus for accomplishing this has comprised a scale disposed below the surge bin. A truck would drive onto the scale where it would be weighed empty. The truck would then be filled from the surge bin and weighed again. The difference in the truck's weight would therefore be the weight of the asphalt-aggregate material dispensed from the surge bin. Such an apparatus, although accurate for large loads from fixed surge bins is usually not suitable for portable and/or collapsible surge bins due to the fact that such scales are typically quite large and heavy and are often permanently mounted in the ground.

Another prior apparatus provided a collector between the surge bin and the truck. A quantity of material would be discharged from the surge bin into the collector. The collector would then be weighed and the difference from its empty weight would be equal to the weight of the material dispensed from the surge bin. The collector would then empty the weighed material into the truck. This system is sometimes undesirable because it requires an additional piece of apparatus mounted below the surge bin which thereby prevents or at least hinders the collapsibility of the surge bin. Furthermore, additional pieces of apparatus make the surge bin more difficult to transport.

SUMMARY OF THE INVENTION

The present invention relates generally to apparatus for weighing-out material in a surge bin. More particularly, the present invention relates to apparatus for weighing-out asphalt-aggregate material from a collapsible surge bin. Generally described, the apparatus of the invention includes a surge bin mounted on a collapsible frame with the points or elements of attachment of the surge bin to the frame being load cells which are connected to control circuitry for weighing the surge bin and the contents thereof.

Control circuitry may be used to actuate a gate in the bottom of the surge bin to permit accurate weighing-out of a predetermined amount of asphalt-aggregate material into a truck below the surge bin. A batcher disposed above the surge bin temporarily collects asphalt-aggregate material from a conveyor and selectively discharges the collected material into the surge bin. Additionally, control circuitry may be used to empty the material in the batcher into the surge bin to prevent overflow of the batcher during a weigh-out operation without interrupting the continuous flow of asphalt-aggregate material from the conveyor supplying the material to the batcher.

Accordingly, it is an object of the present invention to provide an improved surge bin weigh-out apparatus.

It is another object of the present invention to provide surge bin weigh-out apparatus in combination with a portable or a collapsible surge bin.

These and other objects, features and advantages of the present invention will become apparent from a review of the following detailed description of the disclosed embodiment and the appended drawing and claims.

BRIEF DESCRIPTION OF THE DRAWING

FIG. 1 is a side view of a disclosed embodiment of the weigh-out apparatus of the present invention with a collapsible surge bin shown in the raised position.

FIG. 2 is a side view of the weigh-out apparatus and collapsible surge bin shown in FIG. 1, showing the collapsible surge bin in the lowered position.

FIG. 3 is a top view of the collapsible surge bin shown in FIG. 1, with the drag chute broken away to expose the winch mechanism.

FIG. 4 is a detailed view of an attachment point and a load cell of the weigh-out apparatus shown in FIG. 1.

FIG. 5 is a cross-sectional view taken along the line 5—5 of the attachment point and load cell shown in FIG. 4.

FIG. 6 is a cross-sectional view taken along the line 6—6 of the attachment point and load cell shown in FIG. 4.

FIG. 7 is a schematic block diagram of a disclosed embodiment of the control circuitry of the present invention.

DETAILED DESCRIPTION OF THE DISCLOSED EMBODIMENT

Referring now to the drawing in which like numbers indicate like elements, it will be seen that there is a surge bin 10 and a drag chute 12 mounted on a flat bed trailer 14 which includes side beams 15 extending above the flat bed or platform of the trailer. In the raised position (best shown in FIG. 1), the surge bin 10 stands on a pair of front support legs 16 and a pair of rear support legs 17 each of which is attached at its lower end to a side beam 15 of the trailer 14 by pivot pins 18. The pivot pins 18 permit the support legs 16 and 17 to fold forward into a position parallel to the bed of the trailer 14. The upper ends of the support legs 16 and 17 are pivotally attached to cross braces 20 and 22 by pivot pins 24. The cross braces 20 and 22 are securely attached to each other by two tie braces 26 and 28 shown in FIG. 3. Therefore, although the support legs 16 and 17 are pivotally attached at both ends thereof, the rigidly connected cross braces 20 and 22 and tie braces 26 and 28 prevent the legs from moving independently of each other. The combination of the pivot pins 18, 24 and the cross and tie braces 20, 22, 26, 28 provides a rigid yet foldable leg structure.

Disposed on top of this foldable leg structure is the surge bin 10. The surge bin 10 is convertible from a raised configuration, as shown in FIG. 1, to a lowered configuration as shown in FIG. 2, in a manner described in detail hereinafter.

The surge bin 10 is comprised of four side panels 30, 32, 34, 36 which remain essentially vertical when the surge bin is in both the raised and the lowered configuration. A foldable side panel 37 provides a door in the side panel 36. The foldable side panel 37 may be in a vertical position when the apparatus is in the raised configuration and may be folded into the surge bin when the apparatus is in the lowered configuration, as shown in dotted lines in FIG. 2. The surge bin 10 is further comprised of four bottom panels 38, 40, 42, 44 attached to the lower end of the side panels 30-36 and inclined away from vertical to form a rectangular funnel shape with a rectangular opening at the bottom. A wedged-shaped batch splitter 45 is removably located inside the surge bin 10, and a gate 46, as shown in FIG. 3, covers the rectangular opening in the bottom of the surge bin. The gate 46 is operable in response to control circuitry shown in FIG. 7.

The surge bin 10 is mounted atop the support leg structure by four vertical braces 47 attached at their upper ends to the side panels 30-36 at the corners formed thereby. The lower end of each of the braces 47 rests on a load cell 48, best shown in FIGS. 4-6, which bridges a gap between two support blocks 50, 52 attached to the tie brace 20. The load cells 48 converts the downward pressure exerted by the weight of the surge bin 10 and any contents thereof into an electric current. The load cell 48 is connected by wires 54 to control circuits where the electric current is converted through electric circuits known in the art, for example, by specially designed microprocessors, to provide a readout of the weight resting on each load cell. Further processing of these signals, as known in the art, to sum the weight resting on each load cell 48 gives an indication of the weight of the surge bin 10 and the contents thereof. It will be appreciated by those skilled in the art that the summing of the weights resting on the four load cells 48 also reduces or eliminates errors induced by wind in certain prior art systems. The load cells 48 may be of a conventional type, such as a "weigh-beam" or "moment-beam" type available from Transducers, Inc. Other types of load cells known in the art may also be used.

A bolt 56 extending through the tip of the vertical brace 47 and below the load cell 48 provides extra stability to the surge bin 10 in that the bolt 56 prevents the vertical brace 47 from lifting off of the load cell if the surge bin were to tip during, for example, raising or lowering of the surge bin. Additionally, during times of nonuse, the downward pressure exerted on the load cell may be relieved by screwing a bolt 58 extending downwardly from a bracket 60 extending outwardly from the vertical brace 47 into a recess 62 provided in the cross braces 20, 22 for receiving the end of the bolt 58. When the bolt 58 is thusly screwed down into the recess 62 for each of the four vertical braces 47 the weight of the surge bin 10 and the contents thereof may be supported by the bolt rather than by the end of the vertical brace resting on the load cell 48. Thus, for example, during transport of the surge bin 10 from site to site, excessive loads on the load cells 48 which might result from bumps in the road may be prevented.

Mounted on the rear of the trailer 14 and extending upwardly and forwardly therefrom is a drag chute 12. The drag chute 12 is comprised of a chute enclosure 64 having a drag chain (not shown) therein, as is known to those skilled in the art. The drag chain makes a circuitous path along the length of the interior of the drag chute enclosure 64 from its lower end to its upper end. The drag chain is driven by a motor 66 mounted on the upper end of the drag chute 12.

The lower end of the drag chute 12 is pivotally attached to the rear of the trailer 14 by pivot pins 68. The pivotal attachment of the drag chute 12 permits it to rotate about the pivot 68 through an angle of approximately 30 degrees from a position slightly above horizontal to an angle of approximately 60 degrees.

Attached to the upper end of the drag chute 12 is a batcher assembly 70. The batcher assembly 70 extends downwardly from the upper end of the drag chute 12 in a substantially vertical direction when the surge bin 10 is in the raised position, as shown in FIG. 1. In the bottom of the batcher assembly 70 are doors (not shown) which can be opened and closed in response to the control circuitry connected to the load cells 48. Also, located near the top of both the batcher assembly 70 and the surge bin 10 are motor driven paddle wheels (not shown). The purpose of the paddle wheels will be described further hereinbelow.

At a point near the mid-point of the length of the drag chute 12, a pair of linkages 72 pivotally attach the drag chute to the support leg structure and the tie brace 28 by means of pivots 74 on the drag chute and pivots 76 extending from the tie brace 28. The pivotal attachment of the drag chute 12 to the tie brace 28 allows the drag chute to move in unison with the surge bin 10 as it is raised and lowered. Thus, it will be appreciated that the weight of the drag chute 12 supported by the linkages 72 bears upon the tie brace 28, rather than on the surge bin 10, and therefore does not affect the weight of the surge bin as measured by the load cells 48.

The erecting mechanism for raising and lowering the surge bin and drag chute is located on the aft portion of the trailer 14. The mechanism comprises a conventional winch apparatus 78 having a cable 80 wound on a drum 82 with the cable extending from opposite sides of the drum, as shown in FIG. 3. Located on either side of the winch 78 are posts 84 attached to the trailer 14 and having two slant braces 86, 88 attached thereto to give each post extra strength and rigidity in the direction of the longitudinal axis of the trailer. A pulley 90 is attached to the lower portion of each slant brace 86 and a second pulley 92 is attached to the top portion of each post 84. The cable 80 feeds from the drum 82 through the first pulleys 90, then upwardly and parallel to the slant braces 86, through the second pulleys 92, whereupon the ends of the cable are attached to the support legs 17 by means of pin eye brackets 94 attached thereto. Thus, it will be appreciated that when the cable 80 is reeled into the winch 78, a force is applied to the upper portion of the support legs 17 which will tend to raise them, if in the lowered configuration. Conversely, if the apparatus is in the raised configuration, playing the cable 80 out of the winch 78 will lower the support legs 17 under the weight of the apparatus.

The posts 84 also carry cross bars 96 which extend to a position adjacent the rear legs 17 of the surge bin 10. Mating holes 98, 100 are located in the cross bars 96 and the legs 17, respectively. When the surge bin 10 is in the raised position, locking pins 102 fit through the holes 98, 100 to secure the bin 10 in the raised configuration.

It will be understood by those skilled in the art that other means, such as hydraulic cylinders, may be used to pivotally raise and lower the drag chute and surge bin.

In operation, the apparatus is assumed to be initially in the lowered configuration. The trailer 14 is attached to a conventional cab by a hitch 104 and transported to the desired site. The rear of the trailer is then backed up to an asphalt plant where asphalt material is being produced. An operator in a control house 106, shown in dotted lines in FIG. 1, activates the winch apparatus 78 which then reels in the cable 80. As the cable 80 is reeled in, it raises the surge bin 10 on the support legs 16 and 17. Since the drag chute 12 is also attached to the surge bin 10, as the winch 78 raises the surge bin, it also raises the drag chute.

When the surge bin 10 is in its fully erect position, the legs 17 are secured in the raised position by inserting the pins 102 into the holes 98, 100 in the cross bars 96 and legs 17. When thusly secured, the drag chute 12 and the surge bin 10 are firmly held in the raised position.

Before the surge bin 10 is operational, the foldable side panel 37 is raised and secured in position by bolts (not shown). Additionally, the wedge-shaped batch splitter 45 is attached to the inside of the surge bin 10. Ramps (not shown) may be provided on either side of the trailer 14 so that trucks may be driven up onto the trailer directly under the surge bin 10. The bolts 58 are also unscrewed so that their ends do not rest in the recess 62, thereby permitting the entire weight of the surge bin 10 to rest on the load cells 48.

Typically, asphalt-aggregate material is delivered to the lower end of the drag chute 12 by a conveyor from an asphalt drum mix plant. The asphalt-aggregate material is then moved from the lower end of the drag chute 12 to the upper end of the drag chute by the drag chain (not shown) which is driven by the motor 66. When the asphalt-aggregate material reaches the upper end of the drag chute 12, it falls into the batcher assembly 70 which has its doors (not shown) in the closed position. The doors are held closed until a quantity of asphalt-aggregate material has collected in the batcher assembly 70. The doors of the batcher assembly 70 are then opened and the asphalt-aggregate material falls into the surge bin 10 in a "batch" rather than in a continuous stream. This is done to minimize segregation of larger pieces of aggregate material from smaller pieces of the aggregate material in the asphalt mix. To further aid in the prevention of segregation of the asphalt material as it is loaded into a truck, the batch splitter 45 in the bottom of the surge bin 10 divides the asphalt material into two streams as it leaves the surge bin.

The gate 46 in the bottom of the surge bin 10 is initially closed to permit the batches of asphalt-aggregate material to collect in the surge bin. A truck is then driven onto the trailer 14 directly under the surge bin 10. When a quantity of asphalt-aggregate material has collected in the surge bin 10, a reading of the weight of the surge bin and the asphalt-aggregate material therein is taken by converting the signal supplied to the control circuitry from the load cells 48 to its corresponding weight equivalent. It should be noted that the doors of the batcher assembly 70 are held in a closed position during this operation so that no additional asphalt-aggregate material is added to the surge bin 10.

The gate 46 of the surge bin 10 is then opened and the asphalt-aggregate material is discharged from the surge bin into the waiting truck. As the material is being discharged from the surge bin 10, the pressure exerted on the load cells 48 decreases, which registers as a change in weight of the surge bin and its contents on the control circuitry. The absolute value of the difference in weight between the weight of the surge bin 10 plus the original contents and the weight of the surge bin plus the remaining contents is equal to the weight of the material discharged from the surge bin. Thus, while the asphalt-aggregate material is being discharged from the surge bin 10 into the truck, the change in weight is continuously monitored by the control circuitry. When the desired weight of asphalt-aggregate material has been loaded onto the truck, the gate 46 of the surge bin 10 is closed, thus preventing more asphalt-aggregate material from falling from the surge bin into the truck. The loaded truck may then be driven off the trailer 14 and replaced by an empty truck.

If the entire contents of the surge bin 10 are emptied before the desired weight has been loaded on the truck, the gate 46 may be closed and the door of the batcher assembly 70 opened to provide an additional quantity of asphalt-aggregate material to the surge bin 10. After the door of the batcher assembly 70 has been closed a new weight reading for the surge bin 10 plus its contents may be established and the gate 46 opened to continue loading the truck. The weight difference in this second loading operation may be summed with the weight of the first loading operation to provide the total weight of the material loaded onto the truck. This reloading and summing operation may be automatically done by the control circuitry using techniques known in the art.

As a loading operation is proceeding, asphalt-aggregate material is continuously being supplied to the batcher assembly 70 from the drag chute 12. Normally, the material is merely collected in the batcher assembly 70 during a loading operation and then discharged into the surge bin 10 after the weighing operation is finished and the gate 46 of the surge bin is closed. However, if the loading operation were to take too long, the batcher assembly 70 might overflow and the supply of material from the drag chute 12 have to be stopped. This is an undesirable situation in that the overflow might fall into the surge bin 10 during a weighing operation, thus inducing an error in the indicated weight of loaded material. Furthermore, it is virtually impossible to stop the drag chute 12 alone without undesirable side effects since asphalt-aggregate material is being continuously supplied from the drum mix plant to the lower end of the drag chute. To avoid such a situation, when the batcher assembly 70 is filled to its capacity with asphalt-aggregate material, the control circuitry will interrupt the loading operation by closing the gate 46, opening the door of the batcher assembly 70 to discharge the material therein, closing the door of the batcher assembly, establishing a new weight for the surge bin 10 plus asphalt-aggregate material, opening the gate 46 to continue the loading operation and summing the loading weights of the two loading operations to establish the total load weight. Thus, it will be appreciated that the control circuitry permits the drag chute 12 to operate uninterrupted and also avoids overflow of the batcher assembly 70, while still permitting accurate weight-out of the asphalt-aggregate material from the surge bin 10.

There is also provided an emergency override system. Motor driven paddle wheels (not shown) near the top of the batcher 70 and the surge bin 10 are designed so that the paddle wheels will turn under normal conditions; but when the batcher or the surge bin are filled to capacity, their respective paddle wheels will no longer turn. The motor driven paddle wheels are connected to the control circuitry so that when either paddle wheel stops turning the control circuitry will stop the flow of asphalt-aggregate material by stopping the drag chain in the drag chute 12. An emergency indicator will also be activated.

When the surge bin 10 is no longer needed at a particular location, it may be converted into the lowered configuration for more convenient transport. First, the batch splitter 45 is removed from the surge bin 10. The foldable side panel 37 is then unbolted and folded down inside the surge bin 10, the locking pins 102 are then removed from the cross bars 91 and the legs 17. The surge bin 10 may then be lowered by unreeling the cable 80 from the winch 78. As the cable 80 is played out, the weight of the surge bin 10 causes the legs 16 and 17 to fold forward and downward until the surge bin is completely lowered onto the trailer 14.

Since the drag chute 12 is pivotally attached to the tie brace 28 of the surge bin 10 by means of the linkages 72, as the surge bin is lowered, the drag chute will be lowered simultaneously. A particular advantage of the collapsible surge bin is that the arrangement of the linkages 72 and the foldable side panel 37 permits the upper end of the drag chute 12 and the batcher assembly 70 to nest inside the surge bin 10 when in the lowered position. The nesting feature of the drag chute 12 permits the entire apparatus to assume a lower profile when in the lowered configuration and thus makes the apparatus more stable and earier to transport.

When the surge bin 10 and drag chute 12 have been lowered, the bolts 58 are then screwed down into the recess 62 so that the vertical braces 47 will not exert excessively high loads on the load cells 48 which might be caused by the trailer 14 going over bumps in a road while the apparatus is being transported from one site to another. A conventional truck tractor may be hitched to the trailer 14 and the entire apparatus may be moved to a different location where it can again be quickly and easily raised to its operating configuration.

It will be understood by those skilled in the art that the apparatus of the present invention may be used to weigh-out any material, in addition to asphalt mix, which may be conveyed to and delivered from a surge bin.

The relationship of the control circuitry to the other components of the disclosed asphalt-aggregate delivery system is shown in FIG. 7. The control circuitry of the present invention is a microprocessor represented by block 104. The four load cells 48 are represented by blocks 106–112 which are connected to the control circuit block 104. The motor driven paddle wheel in the batcher 70, shown by block 114, and the motor driven paddle wheel in the surge bin 10, shown by block 116, are each connected to the control circuitry block 104.

In response to the signals supplied by the load cells, blocks 106–112, and the paddle wheels, blocks 114, 116, the control circuit block 104 operates the gate 46 in the bottom of the surge bin 10, shown by block 118, the door in the bottom of the batcher 70, shown by block 120, and the motor 66 for driving the drag chain in the drag chute 12, shown by block 122, as has already been described hereinabove. The design of the microprocessor so as to provide the features described above is within the skill of the art.

It should be understood, of course, that the foregoing relates only to a preferred embodiment of the present invention and that numerous modifications or alterations may be made therein without departing from the spirit and scope of the invention as set forth in the appended claims.

I claim:

1. A method of weighing and dispensing material from a surge bin comprising the steps of:

collecting said material in a batcher to a predetermined amount;

dispensing said collected material from said batcher into said surge bin;

dispensing a quantity of material from said surge bin while again collecting material in said batcher to said predetermined amount;

continuously weighing said surge bin and material therein as said material is dispensed from said surge bin to determine an initial weight of material dispensed from said surge bin;

interrupting dispensing of said material from said surge bin responsive to said predetermined amount of material being collected in said batcher;

storing said initial weight of material dispensed from said surge bin prior interruption of dispensing of said material from said surge bin;

dispensing said predetermined amount of collected material from said batcher into said surge bin;

weighing said surge bin and material therein to establish the weight of said surge bin and material therein;

dispensing a quantity of said material from said surge bin; and continuously weighing said surge bin and material therein while material is being dispensed from said surge bin to determine a further weight of material dispensed from said surge bin.

2. The method of claim 1, further comprising the steps of:

responsive to said material being completely dispensed from said surge bin prior to said batcher collecting said predetermined amount, terminating dispensing of material from said surge bin by closing a dispensing opening in said surge bin through which said material is dispensed;

storing the weight of material dispensed from said surge bin;

responsive to said batcher collecting said predetermined amount of said material, dispensing said collected material from said batcher into said surge bin;

weighing said surge bin and the material therein to establish the weight of said bin and said material;

dispensing a quantity of material from said surge bin; and continuously weighing said surge bin and material therein to determine a further weight of material dispensed from said surge bin.

* * * * *